(12) United States Patent
Wang et al.

(10) Patent No.: US 8,488,619 B2
(45) Date of Patent: Jul. 16, 2013

(54) ALLOCATING INTERLACE MULTIPLEX PAIRS FOR MULTICAST SERVICES

(75) Inventors: Liwa Wang, Morris Plains, NJ (US); Yang Yang, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 661 days.

(21) Appl. No.: 12/481,229

(22) Filed: Jun. 9, 2009

(65) Prior Publication Data

US 2010/0309814 A1    Dec. 9, 2010

(51) Int. Cl.
*H04L 12/28* (2006.01)
*H04W 4/00* (2009.01)

(52) U.S. Cl.
USPC ........................................ 370/431; 455/422.1

(58) Field of Classification Search
USPC ............... 370/254, 312, 431, 458; 455/422.1, 455/446
See application file for complete search history.

(56) References Cited

U.S. PATENT DOCUMENTS

| | | | |
|---|---|---|---|
| 6,052,596 A | 4/2000 | Barnickel | 455/450 |
| 7,653,027 B2 * | 1/2010 | Kim et al. | 370/334 |
| 7,839,812 B2 * | 11/2010 | Kyung et al. | 370/312 |
| 2003/0001779 A1 * | 1/2003 | Mintz et al. | 342/463 |
| 2004/0233888 A1 | 11/2004 | Bonta | 370/350 |
| 2005/0058137 A1 * | 3/2005 | Carlson et al. | 370/395.4 |
| 2005/0063347 A1 * | 3/2005 | Sarkkinen et al. | 370/338 |
| 2005/0286467 A1 | 12/2005 | Chang | 370/330 |
| 2006/0002362 A1 * | 1/2006 | Subrahmanyam et al. | 370/345 |
| 2006/0109815 A1 | 5/2006 | Ozer | 370/329 |
| 2006/0285601 A1 * | 12/2006 | Julian et al. | 375/260 |
| 2007/0049314 A1 * | 3/2007 | Balachandran et al. | 455/518 |
| 2007/0058660 A1 | 3/2007 | Sammour | 370/445 |
| 2007/0211665 A1 * | 9/2007 | Yoshida et al. | 370/331 |
| 2007/0274288 A1 * | 11/2007 | Smith et al. | 370/351 |
| 2008/0095140 A1 * | 4/2008 | Khan | 370/345 |
| 2008/0159252 A1 * | 7/2008 | Bi et al. | 370/345 |
| 2009/0080384 A1 * | 3/2009 | Leung | 370/336 |
| 2009/0082025 A1 * | 3/2009 | Song | 455/446 |
| 2009/0135744 A1 * | 5/2009 | Chaudhri et al. | 370/278 |
| 2010/0136998 A1 * | 6/2010 | Lott et al. | 455/453 |
| 2010/0246467 A1 * | 9/2010 | Song et al. | 370/312 |
| 2010/0260089 A1 * | 10/2010 | Lin et al. | 370/312 |

FOREIGN PATENT DOCUMENTS

| | | |
|---|---|---|
| EP | 0 954 192 A1 | 11/1999 |
| EP | 1 217 852 A1 | 6/2002 |
| EP | 1 796 418 A1 | 6/2007 |

OTHER PUBLICATIONS

International Search Report and Written Opinion dated Sep. 21, 2010.

* cited by examiner

*Primary Examiner* — Ayaz Sheikh
*Assistant Examiner* — Hoang-Chuong Vu
(74) *Attorney, Agent, or Firm* — Williams, Morgan & Amerson (57) ABSTRACT

The present invention provides a method implemented in a control entity within a wireless communication system. The method includes selecting, at the control entity, a plurality of sectors in response to receiving requests for a multicast service from mobile units located within the plurality of sectors. The method also includes allocating, at the control entity, one or more interlace-multiplex pairs for providing the multicast service to the mobile units within the plurality of sectors. One or more of the interlace-multiplex pairs are allocated based on a priority list that ranks priorities of the plurality of interlace-multiplex pairs according to how many of the plurality of sectors provide the multicast service using the corresponding interlace-multiplex pair. The method also includes establishing a call flow over an air interface to the mobile units using the allocated interlace-multiplex pair(s).

14 Claims, 5 Drawing Sheets

| CLUSTER PRIORITY LIST 305 | | RNC PRIORITY LIST 310 | |
|---|---|---|---|
| 1,2 | 11 | 2,2 | 6 |
| 3,2 | 5 | 3,4 | 1 |
| 4,3 | 2 | 4,3 | 1 |
| 2,4 | 1 | 2,4 | 0 |
| ⋮ | | ⋮ | |

| CLUSTER PRIORITY LIST | |
|---|---|
| 1,2 | 11 |
| 3,2 | 5 |
| 4,3 | 2 |
| 2,4 | 1 |
| ... | |

Figure 3A

| RNC PRIORITY LIST | |
|---|---|
| 2,2 | 6 |
| 3,4 | 1 |
| 4,3 | 1 |
| 2,4 | 0 |
| ... | |

Figure 3B

| LOCAL PRIORITY LIST | |
|---|---|
| 4,4 | 3 |
| 4,2 | 2 |
| 3,3 | 1 |
| 2,4 | 1 |
| ... | |

ALLOCATING INTERLACE MULTIPLEX PAIRS FOR MULTICAST SERVICES

BACKGROUND OF THE INVENTION

1. Field of the Invention

This invention relates generally to communication systems, and, more particularly, to wireless communication systems.

2. Description of the Related Art

Wireless communication systems use a network of access points such as base stations to provide wireless connectivity to various access terminals, such as mobile units and/or other devices that are enabled for wireless communication. The coverage area of a wireless communication system is typically divided into a number of geographic areas that are conventionally referred to as cells or sectors. The coverage area of each cell in the wireless network is limited by the propagation loss of radio signals transmitted by access points that provide coverage to the cell. Thus, the coverage area of each cell is determined by the location and the transmit power of the access point, as well as the geography of the cell and the location of any interfering objects. For example, the coverage area of a cell may be reduced if a building or a mountain is present near the access point. The boundaries of the cells are not rigidly defined and may vary with time. Thus, coverage areas may overlap such that multiple access points may provide coverage to the overlapping regions, although the strength of the signal provided within the overlapping regions may be different for the different access points.

Access terminals located in the coverage area of a cell may access the wireless communications system by establishing a wireless communication link, often referred to as an air interface, with the access point associated with the cell. Once an access terminal has connected to the system, the access terminal can communicate using unicast (i.e., point-to-point) communication and/or multicast (i.e., point-to-multipoint) communication. One example of a multicast service is the push-to-talk (PTT) service. Subscribers to the PTT service can join groups of access terminals that are able to communicate with each other. When a user of one of the access terminals in the group speaks or transmits other data, the other users within the group can hear the voice transmission or receive the data transmission. Access terminals in a PTT group can be in the same cell or sector or can be distributed across multiple cells and/or sectors.

The resources of the air interface are divided into temporal interlaces. Each interlace is an interval of time that can be allocated to a particular service, access terminal, and/or access point. The interlace structure consists of a time interval corresponding to a predetermined number of interlaces. The interlace structure is then repeated after the previous set of interlaces is over. For example, if the interlace structure includes four interlaces, then the interlace structure consists of the time interval assigned to the first interlace, the time interval assigned to the second interlace, the time interval assigned to the third interlace, the time interval assigned to the fourth interlace, and then the structure repeats again following the fourth interlace.

Each interlace is further subdivided into a plurality of multiplexes. Different communication systems can support different numbers of multiplexes for each interlace. For example, some communication systems can support 4, 8, or 12 multiplexes for each interlace. Typically, one interlace is reserved for control information and the remaining interlaces can be used to transmit voice and/or data. The interlace-multiplex pairs that aren't reserved for control information can be allocated to various services, including broadcast and/or multicast services. For example, a system that supports four interlaces of four multiplexes has a total of 16 interlace-multiplex pairs and 12 of the interlace-multiplex pairs can be used to transmit voice and/or data.

Broadcast and/or multicast services can be transmitted in one or more allocated interlace-multiplex pairs. For example, an access point may be allocated a first interlace-multiplex pair to support a PTT service for a group of users in a sector associated with the access point. The group of PTT users may also include users that are located in other sectors served by different access points. The users located in the different sectors may be able to use the same interlace-multiplex pair but, in some cases, this interlace-multiplex pair may have been previously allocated to a different service. In that case, the users in the other sectors have to be allocated to a different interlace-multiplex pair. Consequently, a single broadcast and/or multiplex call or data flow may need to use several interlace-multiplex pairs to maintain the call or data flow with multiple users in different sectors.

Interlace-multiplex pairs are a scarce air interface resource and the conventional techniques for allocating interlace-multiplex pairs to broadcast and/or multiplex services have a number of drawbacks. For example, the conventional technique for allocating interlace-multiplex pairs can lead to numerous interlace-multiplex pairs in different sectors being allocated to the same call or flow. Allocating additional interlace-multiplex pairs to the same call and/or flow prevents these interlace-multiplex pairs from being utilized to provide other services, which decreases the overall broadcast and/or multicast capacity of the system. Furthermore, using multiple interlace-multiplex pairs to support the same call and/or flow in different sectors can significantly complicate the handoff procedure when an access terminal moves from a sector that uses a first interlace-multiplex pair to a sector that uses a second interlace-multiplex pair. These complications can introduce delays into the handoff process and, in some cases, lead to the user being dropped from the broadcast and/or multicast call or flow.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for implementation in a control entity within a wireless communication system. The method includes selecting, at the control entity, a plurality of sectors in response to receiving requests for a multicast service from mobile units located within the plurality of sectors. The method also includes allocating, at the control entity, one or more interlace-multiplex pairs for providing the multicast service to the mobile units within the plurality of sectors. One or more of the interlace-multiplex pairs are allocated based on a priority list that ranks priorities of the plurality of interlace-multiplex pairs according to how many of the plurality of sectors provide the multicast service using the corresponding interlace-multiplex pair. The method also includes establishing a call flow over an air interface to the mobile units using the allocated interlace-multiplex pair(s).

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
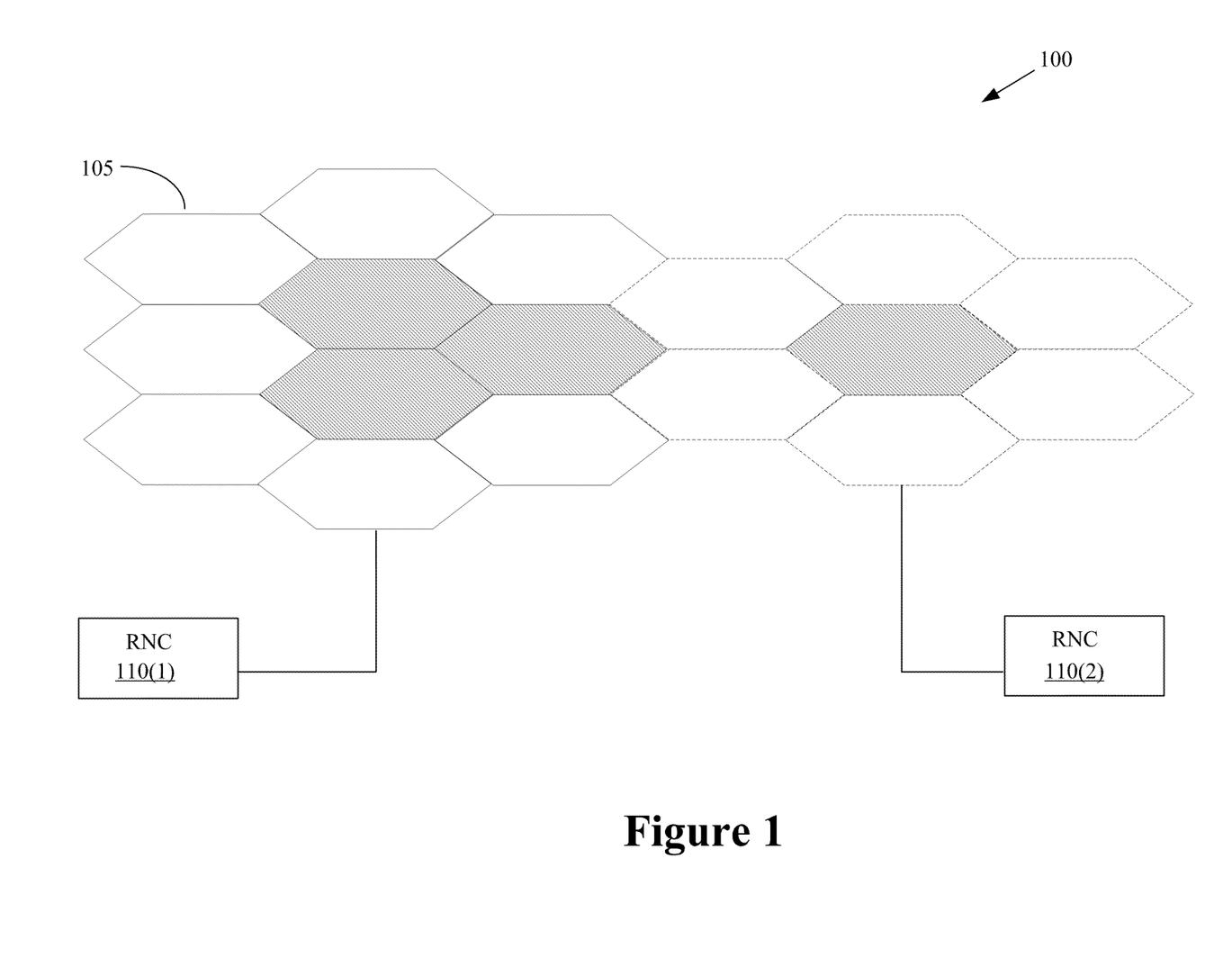
FIG. 1 conceptually illustrates a first exemplary embodiment of a wireless communication system.

FIG. 1 conceptually illustrates a first exemplary embodiment of a wireless communication system 100. In the first exemplary embodiment, the wireless communication system 100 provides wireless connectivity in sectors 105 (only one indicated by a numeral in FIG. 1). Wireless connectivity is provided to the sectors 105 using various wireless access points that may include access networks, base stations, base station routers, Bluetooth access points, devices that conform to the various 802 standards, and the like. Persons of ordinary skill in the art having benefit of the present disclosure should appreciate that the sectors 105 may be cells supported by access networks in a cellular wireless communication system or particular portions of wireless coverage areas supported by different types of access points. Persons of ordinary skill in the art having benefit of the present disclosure will also appreciate that the sectors 105 shown in FIG. 1 are depicted as idealized hexagons, whereas in practice the shapes of the sectors 105 may be determined by an opening angle of one or more antennas, irregular, time variable, and/or overlapping.

Wireless communication within the sectors 105 is, at least in part, coordinated by control entities such as the radio network controllers (RNCs) 110 shown in FIG. 1. Each radio network controller 110 is responsible for coordinating wireless communication within a particular set of sectors 105. In the illustrated embodiment, the radio network controller 110(1) coordinates operation of the sectors 105 indicated by solid boundary lines and the radio network controller 110(2) coordinates operation of the sectors 105 indicated by dashed boundary lines. Persons of ordinary skill in the art having benefit of the present disclosure should appreciate that the number of sectors 105 coordinated by a particular radio network controller 110 is a matter of design choice and not material to the present invention. Furthermore, there are well known techniques for configuring and operating radio network controllers 110 and so only those aspects of the configuration and/or operation of radio network controllers 110 that are relevant to the present techniques will be discussed herein.

Radio network controllers 110 can be used to support various broadcast and/or multicast services within the wireless communication system 100. These services are typically referred to collectively as Broadcast Multicast Services (BCMCS). One common example of a broadcast/multicast service is the push-to-talk service that allows a group of users to establish a call flow that allows all the users in the group to hear voice transmissions and/or receive data transmissions from each of the other users in the group. Broadcast and/or multicast services may also be used to provide services such as pay-per-view programming and other scheduled applications.

Each radio network controller 110 may be concurrently supporting multiple different multicast services used by different groups of subscribers in different combinations of sectors 105. The sectors 105 used for the different multicast services changes dynamically, at least in part because the subscribers are mobile and the boundaries of the sectors 105 can vary as environmental conditions and/or transmission/reception parameters of the sectors 105 change. The radio network controllers 110 are therefore configured to dynamically allocate and re-allocate the scarce air interface resources used to support the broadcast/multicast services. In the illustrated embodiment, the air interface resources are subdivided into temporal interlaces and each interlace is further subdivided into a plurality of multiplexes. The interlace-multiplex pairs can then be allocated to different services by the radio network controllers 110.

Figure 2:
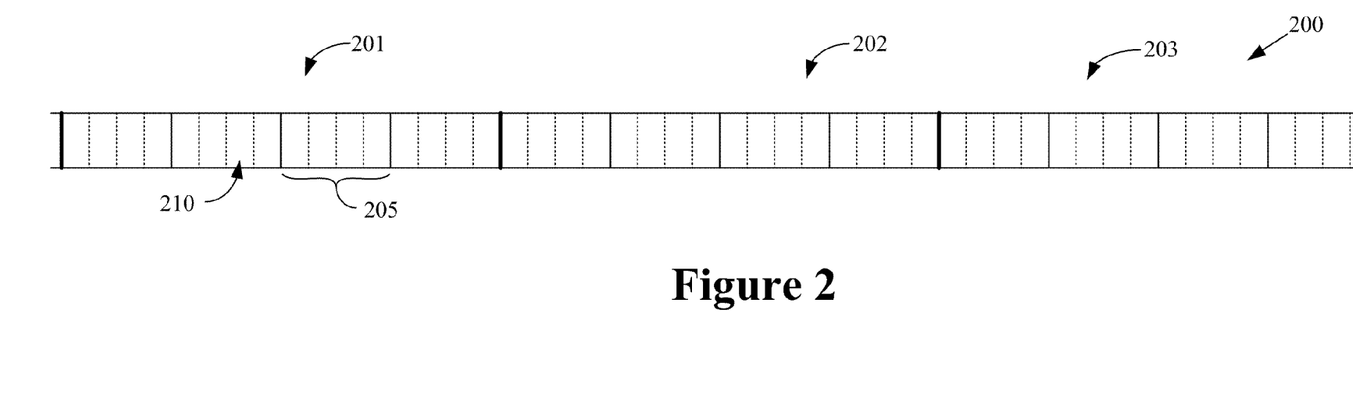
FIG. 2 shows an interlace structure that includes three repetitions of the structure.

FIG. 2 shows an interlace structure 200 that includes three repetitions 201, 202, 203 of structures that each include four interlaces 205. Each interlace 205 is further subdivided into four multiplexes 210. However, persons of ordinary skill in the art having benefit of the present disclosure should appreciate that the present technique can be applied to systems that support any number of interlaces 205 and/or multiplexes 210. For example, the interlace structure 200 could include more or less than four interlaces 205, and each interlace 205 could alternatively support 4, 8, or 12 multiplexes 210. Typically, one interlace 205 is reserved for control information and the remaining interlaces 205 can be used to transmit voice and/or data. The interlace-multiplex pairs that aren't reserved for control information can be allocated to the broadcast and/or multicast services. For example, a system that supports four interlaces 205 of four multiplexes 210 has a total of 16 interlace-multiplex pairs and 12 of the interlace-multiplex pairs can be used to transmit voice and/or data, e.g., among the subscribers to a push-to-talk service.

Referring back to FIG. 1, the radio network controllers 110 can allocate the interlace-multiplex pairs to the sectors 105 using priorities that are assigned to the interlace-multiplex pairs. In the illustrated embodiment, the sectors 105 indicated by cross-hatching include users that are subscribed to the multicast service, such as a push-to-talk service or pay-per-view programming. The cross-attached sectors 105 therefore include the mobile units or access terminals that are being used to access the multicast service and are referred to as target sectors 105. The target sectors 105 for a particular multicast service are grouped into a cluster associated with the multicast service so that the allocation of the interlace-multiplex pairs to the target sectors 105 can be coordinated.

Support sectors 105, which are the non-cross-hatched sectors 105 in the embodiment shown in FIG. 1, may also be included in the cluster associated with the multicast service. The support sectors 105 include sectors that are used for soft combining and/or soft handover of the users that are subscribed to the multicast service. The support sectors 105 may also be sectors that are in active sets associated with the subscribers. In one embodiment, the support sectors 105 are indicated in a list of the sectors 105 that are proximate each of the target sectors 105. This list is conventionally referred to as a neighbor list. Copies of the neighbor lists are maintained by the radio network controllers 110 and may be broadcast to subscribers within the coverage area of the wireless communication system 100. The subscribers can use the neighbor list to select pilot signals that should be monitored to decide which sector 105 should act as the serving sector 105. If the subscriber roams into one of the neighboring sectors 105, the monitored pilot signals may indicate which sector 105 would provide superior connectivity to the subscriber and the subscriber may hand off to this sector 105. Hand-offs may be hard, soft, softer, or any other type of handoff.

The wireless communication system 100 maintains one or more priority lists that prioritize the interlace-multiplex pairs according to how many of the sectors 105 provide the multicast service to subscribers using the corresponding interlace-multiplex pair. Different priority lists may prioritize and/or rank the interlace-multiplex pairs using information collected from different groupings of the sectors 105, as will be discussed herein. The priority lists may then be used to allocate interlace-multiplex pairs to the subscribers of the multicast service to attempt to minimize the total number of interlace-multiplex pairs that are used by the sectors 105 that are providing the multicast service. Using the priority lists may then increase the overall broadcast/multicast capacity of the wireless communication system 100. Once the interlace-multiplex pairs have been allocated to the sectors 105, the call flow for the multicast service can be established using the allocated interlace-multiplex pairs. New target sectors 105 may also be added to (or removed from) an existing call flow for the multicast service and interlace-multiplex pairs can be allocated to the new target sectors 105 using the priority lists, as will be discussed herein.

Figure 3A:
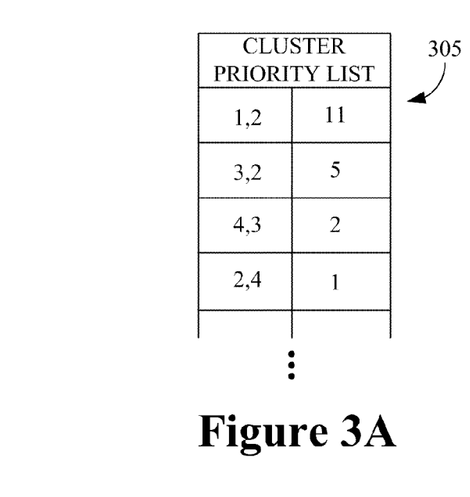
FIGS. 3A, 3B, and 3C illustrate different priority lists that can be used to prioritize and/or rank interlace-multiplex pairs according to the numbers of sectors that have allocated each interlace-multiplex pair.
Figure 3B:
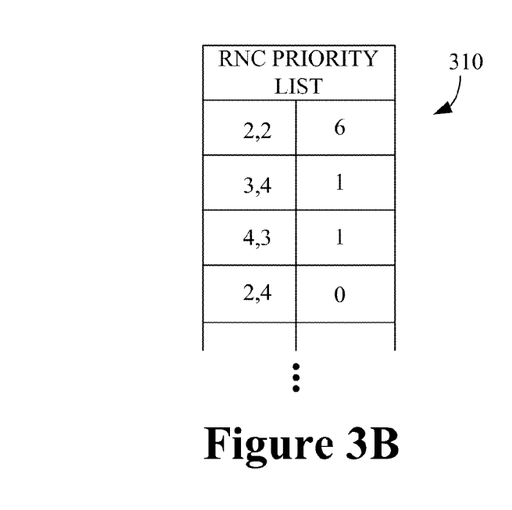
Figure 3C:
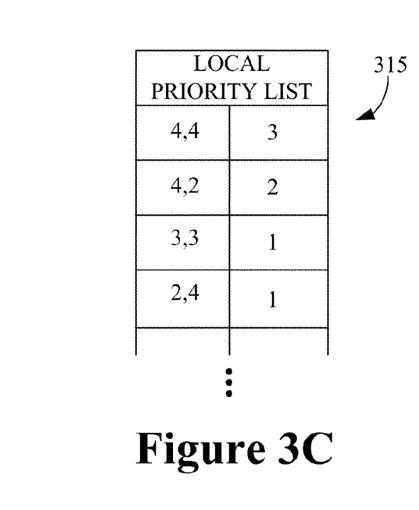

FIGS. 3A, 3B, and 3C illustrate different priority lists 305, 310, 315 that can be used to prioritize and/or rank interlace-multiplex pairs according to the numbers of sectors that have allocated each interlace-multiplex pair. Each of the priority lists 305, 310, 315 in the illustrated embodiment includes a pair of numbers that indicate the interlace and the multiplex, e.g., the pair (1,2) indicates the first interlace and the second multiplex of the first interlace. The lists also indicate the number of sectors that have currently allocated each of the interlace-multiplex pairs, which are then ranked based upon this number. The priority lists 305, 310, 315 can be maintained at radio network controllers and/or other entities within the wireless communication system. For example, radio network controllers in the wireless communication system can use databases, registers, and/or other memory elements to create, store, modify, and/or update the information indicated in the priority lists 305, 310, 315. Furthermore, the priority lists 305, 310, 315 may be stored in a single location in the wireless communication system or may be distributed throughout multiple locations within the wireless communication system.

FIG. 3A depicts a cluster priority list 305 that prioritizes the interlace-multiplex pairs according to how many of the sectors in a cluster are using each interlace-multiplex pair. As discussed herein, the cluster can include all of the target sectors for the multicast service and all of the support sectors associated with each of the target sectors. Interlace-multiplex pairs that are supported by more target sectors in the cluster are listed ahead of interlace-multiplex pairs that are supported by fewer target sectors. In one embodiment, the cluster priority list 305 is formed during call setup for the call flow for the multicast service and may be removed after the interlace-multiplex pair selection process has been completed for the cluster.

FIG. 3B depicts an RNC in-use priority list 310 that prioritizes the interlace-multiplex pairs according to how many of the sectors coordinated by each radio network controller are using each interlace-multiplex pair. One RNC in-use priority list 310 is maintained for each radio network controller and each call flow supported by the radio network controller. Thus, if a radio network controller is supporting call flows for several different multicast services, the radio network controller can maintain a corresponding number of priority lists 310 or each of the call flows. The priority list 310 assigned a higher priority to interlace-multiplex pairs that are used by more target and/or support sectors and assigns lower priority's to the interlace-multiplex pairs that are used by fewer target and/or support sectors. The priority list 310 is updated as interlace-multiplex pairs are allocated and/or de-allocated. Different update frequencies can be used. The priority list 310 can be updated in response to each allocation and/or de-allocation of an interlace-multiplex pair to a target and/or support sector associated with the radio network controller.

FIG. 3C depicts a local in-use priority list 315 that prioritizes the interlace-multiplex pairs according to how many of the neighbor sectors of a newly added target sector are using each interlace-multiplex pair for the multicast service. The neighbor sectors can be indicated in a neighbor list and include target and/or support sectors that are proximate the newly added target sector. The local priority list 315 assigned a higher priority to interlace-multiplex pairs that are used by more sectors in the neighborhood an assigned a lower priority to interlace-multiplex areas that are used by fewer sectors in the neighborhood. The priority list 315 can be formed in response to receiving an indication that a new target sector is going to be added to the call flow of the multicast service, e.g., when a new subscriber initiates the multicast service in the new target sector or when an existing subscriber roams into the new target sector. The priority list 315 may be removed after the interlace-multiplex pairs have been allocated to the new target sector and/or any support sectors.

Figure 4:
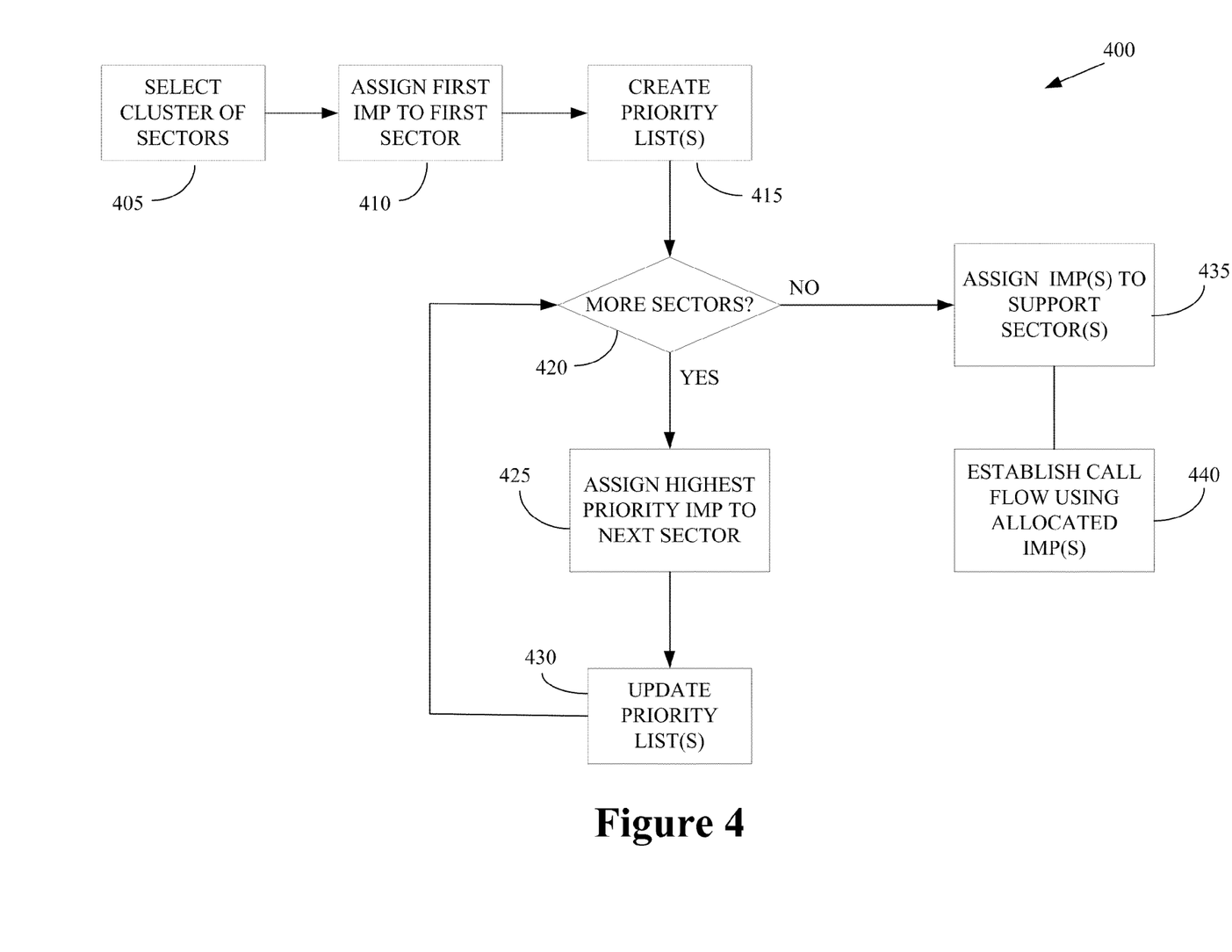
FIG. 4 conceptually illustrates a first exemplary embodiment of a method of allocating interlace-multiplex pairs based on priority lists.

FIG. 4 conceptually illustrates a first exemplary embodiment of a method 400 of allocating interlace-multiplex pairs based on priority lists. In the illustrated embodiment, the method 400 begins by selecting (at 405) a cluster of sectors that includes the target sectors for a multicast service and, if present, support sectors for the selected target sectors. One target sector that includes at least one subscriber to the multicast service may be selected (at 405) and added to the cluster. Support sectors for the target sector may then be selected (at 405) using information such as a neighbor list. If any of the selected (at 405) support sectors are also target sectors (i.e., they include one or more subscribers to the multicast service), then the support sectors associated with these target sectors may also be selected (at 405) and added to the cluster. The selection process may proceed until all of the target sectors and/or support sectors for the multicast service have been selected (at 405) for the cluster.

A first interlace-multiplex pair may then be assigned (at 410) to one of the target sectors. Since no interlace-multiplex pairs have yet been assigned to this multicast service, any available interlace-multiplex pair may be assigned (at 410) to the target sector. The interlace-multiplex pair can be selected randomly or using any other criteria. One or more priority lists may then be created (at 415) in response to allocating the interlace-multiplex pair. In the illustrated embodiment, a cluster priority list and a radio network controller priority list are created (at 415) and the first assigned interlace-multiplex pair is assigned the highest priority. For example, the first assigned interlace-multiplex pair may have a weight that is incremented by a factor such as +1 so that larger weights indicate higher priorities. The method 400 then determines (at 420) whether there are any additional target sectors that require allocation of an interlace-multiplex pair for the multiplex service.

If there is an additional target sector that requires an interlace-multiplex pair, then an interlace-multiplex pair is allocated (at 425) to this target sector based upon the priorities indicated in one or more priority lists. The interlace-multiplex pairs that are available (i.e., the pairs that have not been allocated to other services) are checked to determine their priorities. In the illustrated embodiment, the available interlace-multiplex pair having the highest priority indicated in the cluster priority list may be allocated (at 425) to the target sector. If two of the available interlace-multiplex pairs have equal weights and therefore equal priorities, the interlace-multiplex pair having the largest priority in the radio network controller priority list may be allocated (at 425). The priority lists may then be updated (at 430) by incrementing the weights associated with the allocated interlace-multiplex pair and modifying the rankings/priorities, if necessary. The method 400 may then check to see if there are additional target sectors that need allocation of interlace-multiplex pairs. This process is iterated until there are no additional target sectors that need interlace-multiplex pairs.

When the method 400 determines (at 420) that interlace-multiplex pairs have been allocated to all the target sectors in the cluster, interlace-multiplex pairs can be allocated (at 435) to support sectors in the cluster. Support sectors can be assigned (at 435) the same interlace-multiplex pair as its associated target sector if that interlace-multiplex pair is available. In cases where a support sector has multiple associated target sectors, one of the available interlace-multiplex pairs used by one of the associated target sectors may be selected (at 435) based on the priorities indicated in the cluster priority list and/or the radio network controller priority list. If the interlace-multiplex pair is not available, then no interlace-multiplex pair is assigned (at 435) to the support sector. The priority lists may then be updated by incrementing the weights associated with the allocated interlace-multiplex pair and modifying the rankings/priorities, if necessary. Once the interlace-multiplex pairs have been allocated to support sectors, the wireless communication system can establish (at 440). a call flow for the multicast service in the cluster using the allocated interlace-multiplex pairs.

Figure 5:
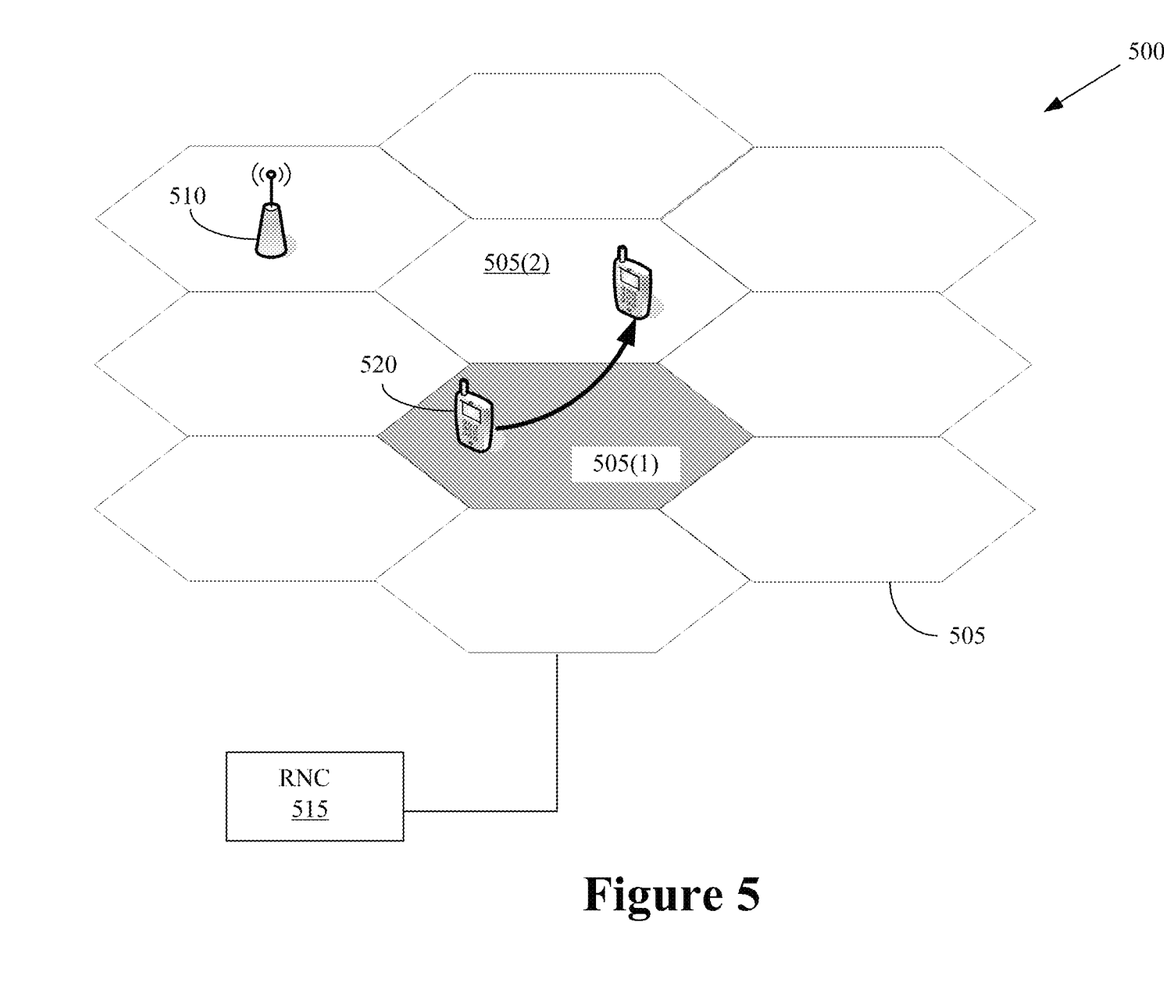
FIG. 5 conceptually illustrates a second exemplary embodiment of a wireless communication system.

FIG. 5 conceptually illustrates a second exemplary embodiment of a wireless communication system 500. In the second exemplary embodiment, the wireless communication system 500 provides wireless connectivity in sectors 505 using access points such as the access point 510. Although in the interest of clarity only a single access point 510 is depicted in FIG. 5, persons of ordinary skill in the art having benefit of the present disclosure should appreciate that one or more access points are used to provide wireless connectivity to each of the sectors 505. In various alternative embodiments, the access point 510 may be include access networks, base stations, base station routers, Bluetooth access points, devices that conform to the various 802 standards, and the like. Wireless communication within the sectors 505 is, at least in part, coordinated by control entities such as the radio network controller (RNC) 515.

In the illustrated embodiment, the radio network controller 515 is providing a multicast service to a subscriber 520 that is in a target sector 505(1) indicated by the crosshatching. The subscriber 520 moves from the target sector 505(1) into another sector 505(2) while the call flow for the multicast service is in operation. The new sector 505(2) is not a target sector for the multicast service and so the wireless communication system 500 adds the sector 505(2) to the cluster that is providing the multicast service. Any support sectors that are not already in the cluster may also be added to the cluster. The radio network controller 515 may then allocate an interlace-multiplex pair to the new target cluster 505(2) for providing the multicast service. The interlace-multiplex pair is allocated based upon one or more priority lists, such as a local in-use priority list that prioritizes the interlace-multiplex pairs according to how many neighboring sectors are using each interlace-multiplex pair.

Figure 6:
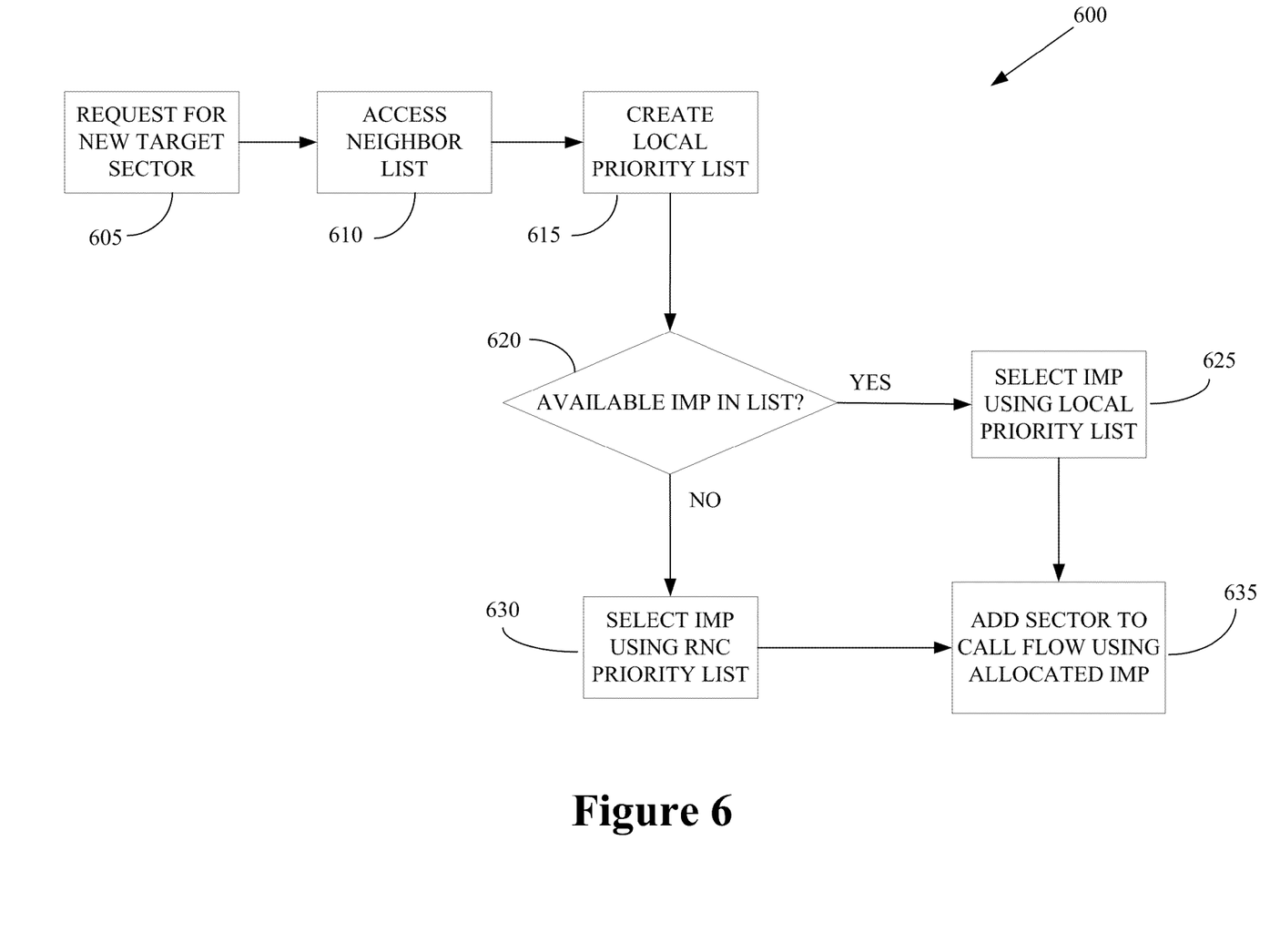
FIG. 6 conceptually illustrates one exemplary embodiment of a method for adding a new target sector to an existing call flow of a multicast service.

FIG. 6 conceptually illustrates one exemplary embodiment of a method 600 for adding a new target sector to an existing call flow of a multicast service. In the illustrated embodiment, the method 600 begins when a radio network controller (or other entity in the wireless communication system) receives (at 605) a request to add a new target sector to a cluster of sectors that are providing the existing call flow. In one embodiment, the request is received (at 605) in response to a subscriber to the existing call flow roaming into a sector that is not currently one of the cluster a sectors that are providing the multicast service. However, persons of ordinary skill in the art having benefit of the present disclosure should appreciate that this is not the only reason that a new target sector may be added to the system. For example, new target sectors may also be added as new subscribers to the multicast service join the existing call flow.

A neighbor list associated with the new target sector is then accessed (at 610) and used to determine the sectors that are neighbors to the new target sector. A local priority list is created (at 615) by weighting the interlace-multiplex pairs according to the number of neighboring sectors that are using each interlace-multiplex pair to provide the multicast service. Interlace-multiplex pairs that are used by larger numbers of neighboring sectors are given higher priorities and/or rankings and interlace-multiplex pairs that are used by smaller numbers of neighboring sectors are given lower higher priorities and/or rankings.

The radio network controller then attempts to allocate an interlace-multiplex pair based on the local priority list. In the illustrated embodiment, the radio network controller determines (at 620) whether the target sector has an available interlace-multiplex pair that is included in the local priority list. An interlace-multiplex pair may be considered available if it is not currently being used by the new target sector to provide any other services. In some cases, an interlace-multiplex pair is only considered available if at least a selected number or percentage of the neighboring sectors is using the interlace-multiplex pair. If the radio network controller determines (at 620) that at least one interlace-multiplex pair is available, then the available interlace-multiplex pair having the highest ranking and/or priority in the local priority list is allocated (at 625) to the new target sector. The interlace-multiplex pair may also be allocated to support sectors associated with the new target sector and any existing priority lists may then be updated.

An interlace-multiplex pair can be selected (at 630) based upon a radio network controller priority list when the radio network controller determines (at 620) that there are no available interlace-multiplex pairs found in the local priority list. Alternatively, if no available interlace-multiplex pairs are found in either priority list, any interlace-multiplex pair that is available to the target sector can be allocated (at 630). The interlace-multiplex pair may also be allocated to support sectors associated with the new target sector and any existing priority lists may then be updated. Once the interlace-multiplex pair has been allocated to the new target sector, the radio network controller can add (at 635) the new target sector to the existing call flow so that the multicast service can be provided to the subscriber in the new target sector.

Referring back to FIG. 5, interlace-multiplex pairs can also be released during the existing call flow. For example, the subscriber 520 may roam out of the target sector 505(2) and so the interlace-multiplex pairs allocated to the sector 505(2) may be released. The interlace-multiplex pairs and/or sectors that are to be released can be communicated to the radio network controller using various messages from the wireless communication system 500. Once the interlace-multiplex pairs are released, the various priority lists can be updated and the rankings/priorities can be modified, if necessary.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method implemented in a control entity within a wireless communication system, comprising:
    selecting, at the control entity, a plurality of sectors in response to receiving requests for a multicast service from mobile units located within the plurality of sectors;
    allocating, at the control entity, at least one of a plurality of interlace-multiplex pairs for providing the multicast service to the mobile units within the plurality of sectors, wherein said at least one interlace-multiplex pair is allocated based on at least one priority list that ranks priorities of the plurality of interlace-multiplex pairs according to how many of the plurality of sectors provide the multicast service using the corresponding interlace-multiplex pair; and
    establishing a call flow over an air interface to the mobile units using said at least one allocated interlace-multiplex pair.

2. The method of claim 1, wherein selecting the plurality of sectors comprises selecting a plurality of sectors that comprises at least one target sector that includes at least one of the mobile units and at least one support sector for said at least one target sector.

3. The method of claim 2, comprising selecting said at least one support sector using a neighbor list for said at least one target sector.

4. The method of claim 1, comprising forming, at the control entity, said at least one priority list.

5. The method of claim 1, comprising adding at least one new target sector to the plurality of sectors after establishing the call flow for the multicast service.

6. The method of claim 1, comprising releasing one or more of the allocated interlace-multiplex pairs and updating said at least one priority list in response to releasing said one or more of the allocated interlace-multiplex pairs.

7. A method implemented in a control entity within a wireless communication system, comprising:
  selecting, at the control entity, a plurality of sectors in response to receiving requests for a multicast service from mobile units located within the plurality of sectors, wherein selecting the plurality of sectors comprises selecting a plurality of sectors that comprises at least one target sector that includes at least one of the mobile units and at least one support sector for said at least one target sector;
  selecting said at least one support sector using a neighbor list for said at least one target sector;
  allocating, at the control entity, at least one of a plurality of interlace-multiplex pairs for providing the multicast service to the mobile units within the plurality of sectors, wherein said at least one interlace-multiplex pair is allocated based on at least one priority list that ranks priorities of the plurality of interlace-multiplex pairs according to how many of the plurality of sectors provide the multicast service using the corresponding interlace-multiplex pair, wherein allocating said at least one interlace-multiplex pair comprises:
  allocating an available interlace-multiplex pair to a first one of the plurality of sectors before assigning any other interlace-multiplex pairs to any other sectors for the multicast service;
  updating said at least one priority list in response to allocating the available interlace-multiplex pair to the first one of the plurality of sectors; and
  allocating one of the plurality of interlace-multiplex pairs to at least a second one of the plurality of sectors based upon said at least one updated priority list; and
  establishing a call flow over an air interface to the mobile units using said at least one allocated interlace-multiplex pair.

8. The method of claim 7, wherein allocating said at least one interlace-multiplex pair comprises iteratively allocating one of the plurality of interlace-multiplex pairs to one of the plurality of sectors based upon said at least one updated priority list and updating said at least one priority list in response to allocating said at least one interlace-multiplex pair, said iteration continuing until interlace-multiplex pairs have been allocated to all the target sectors.

9. The method of claim 8, wherein allocating said at least one interlace-multiplex pair comprises allocating the interlace-multiplex pair that was previously allocated to each target sector to the support sectors corresponding to the target sector.

10. A method implemented in a control entity within a wireless communication system, comprising:
  forming, at the control entity, at least one priority list, wherein forming said at least one priority list comprises:
    forming a first priority list that ranks a plurality of interlace-multiplex pairs according to how many sectors have been allocated a corresponding interlace-multiplex pair; and
    forming at least one second priority list associated with at least one radio network controller, wherein said at least one second priority list ranks the plurality of interlace-multiplex pairs according to how many sectors associated with the radio network controller have been allocated a corresponding interlace-multiplex pair;
  selecting, at the control entity, a plurality of sectors in response to receiving requests for a multicast service from mobile units located within the plurality of sectors;
  allocating, at the control entity, at least one of a plurality of interlace-multiplex pairs for providing the multicast service to the mobile units within the plurality of sectors, wherein said at least one interlace-multiplex pair is allocated based on at least one of the first priority list or the second priority list that ranks priorities of the plurality of interlace-multiplex pairs according to how many of the plurality of sectors provide the multicast service using the corresponding interlace-multiplex pair; and
  establishing a call flow over an air interface to the mobile units using said at least one allocated interlace-multiplex pair.

11. A method implemented in a control entity within a wireless communication system, comprising:
  selecting, at the control entity, a plurality of sectors in response to receiving requests for a multicast service from mobile units located within the plurality of sectors;
  allocating, at the control entity, at least one of a plurality of interlace-multiplex pairs for providing the multicast service to the mobile units within the plurality of sectors, wherein said at least one interlace-multiplex pair is allocated based on at least one priority list that ranks priorities of the plurality of interlace-multiplex pairs according to how many of the plurality of sectors provide the multicast service using the corresponding interlace-multiplex pair; and
  establishing a call flow over an air interface to the mobile units using said at least one allocated interlace-multiplex pair;
  adding at least one new target sector to the plurality of sectors after establishing the call flow for the multicast service, wherein adding said at least one new target sector comprises forming a third priority list that ranks the plurality of interlace-multiplex pairs according to how many sectors in a neighborhood of said at least one new target sector have been allocated the corresponding interlace-multiplex pair.

12. The method of claim 11, comprising allocating one of the plurality of interlace-multiplex pairs to said at least one new target sector based on the third priority list.

13. A method implemented in a control entity within a wireless communication system, comprising:
  selecting, at the control entity, a plurality of sectors in response to receiving requests for a multicast service from mobile units located within the plurality of sectors; and
  allocating, at the control entity, at least one of a plurality of interlace-multiplex pairs for providing the multicast service to the mobile units within the plurality of sectors, wherein said at least one interlace-multiplex pair is allocated based on at least one priority list that ranks priorities of the plurality of interlace-multiplex pairs according to how many of the plurality of sectors provide the multicast service using the corresponding interlace-multiplex pair.

14. The method of claim 13, comprising establishing a call flow over an air interface to at least one of the mobile units using said at least one allocated interlace-multiplex pair.

* * * * *